United States Patent [19]

Yamamura et al.

[11] Patent Number: 5,668,906
[45] Date of Patent: Sep. 16, 1997

[54] CONNECTOR ASSEMBLY FOR ELONGATED ELEMENTS

[75] Inventors: Takehiko Yamamura; Hayato Yuuki, both of Yokkaichi, Japan

[73] Assignee: Sumitomo Wiring Systems, Ltd., Japan

[21] Appl. No.: 662,913

[22] Filed: Jun. 13, 1996

[30] Foreign Application Priority Data

Jun. 13, 1995 [JP] Japan ................... 7-146348

[51] Int. Cl.$^6$ ................... G02B 6/36
[52] U.S. Cl. ................... 385/83; 385/81; 385/84; 385/87; 385/136; 385/137; 385/139
[58] Field of Search ................... 385/60, 62, 76, 385/77, 78, 80, 81, 83, 84, 85, 87, 139, 136, 137

[56] References Cited

U.S. PATENT DOCUMENTS

| | | | |
|---|---|---|---|
| 4,008,948 | 2/1977 | Dalgleish et al. | 385/83 X |
| 4,643,520 | 2/1987 | Margolin | 385/80 X |
| 4,674,833 | 6/1987 | Des Forges et al. | 385/76 X |
| 4,705,352 | 11/1987 | Margolin et al. | 385/80 X |
| 4,799,759 | 1/1989 | Balyasny | 385/83 X |
| 4,934,785 | 6/1990 | Mathis et al. | 385/60 X |
| 5,076,656 | 12/1991 | Briggs et al. | 385/71 |
| 5,157,749 | 10/1992 | Briggs et al. | 385/60 |
| 5,259,052 | 11/1993 | Briggs et al. | 385/78 |
| 5,408,558 | 4/1995 | Fan | 385/80 |

FOREIGN PATENT DOCUMENTS 0375168  6/1990  European Pat. Off. ............ 385/60 X

*Primary Examiner*—Brian Healy
*Attorney, Agent, or Firm*—Jordan B. Bierman; Bierman, Muserlian and Lucas LLP

[57] ABSTRACT

The optical fiber connector assembly including a clamping member, a holding member, and a connector housing provided with a ferrule and a receiving chamber. The optical fiber to be connected has a coated portion and an exposed end. The clamping member is crimped on the coated portion of the fiber and the fiber is inserted into—and held by—the holding member, thus constituting a fixing device. This device, together with the optical fiber, is inserted into the chamber of the connector housing through the opening in its rear, so that the exposed end of the fiber is secured in the ferrule. The clamping member desirably comprises a cylindrical portion fixed to the coated optical fiber, and a flange, by which the clamping member is fixed to the holding member. The holding member can be formed by a pair of elements. One face of each element is configured so that, when the two elements are in opposing abutment, they cover and retain the clamping member and the coated fiber. The whole structure is then fitted into the connector housing and the exposed end is inserted into the ferrule.

12 Claims, 4 Drawing Sheets

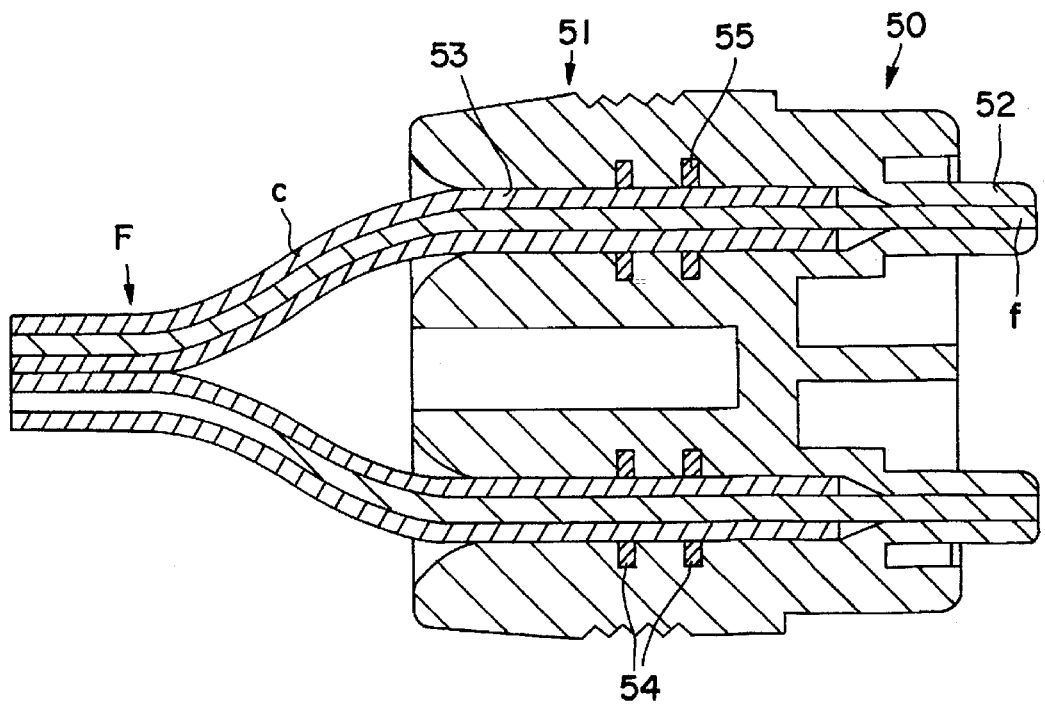
FIG. IA
PRIOR ART
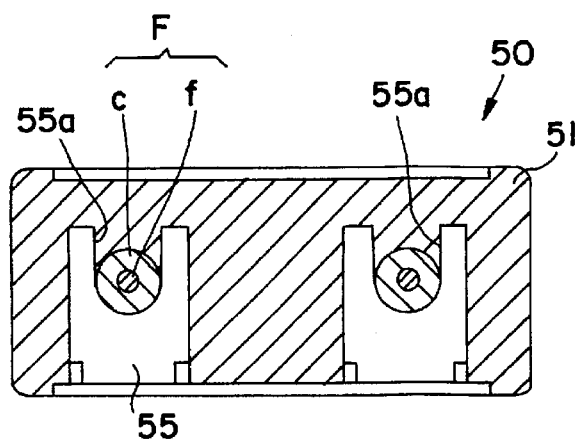
FIG. IB
PRIOR ART

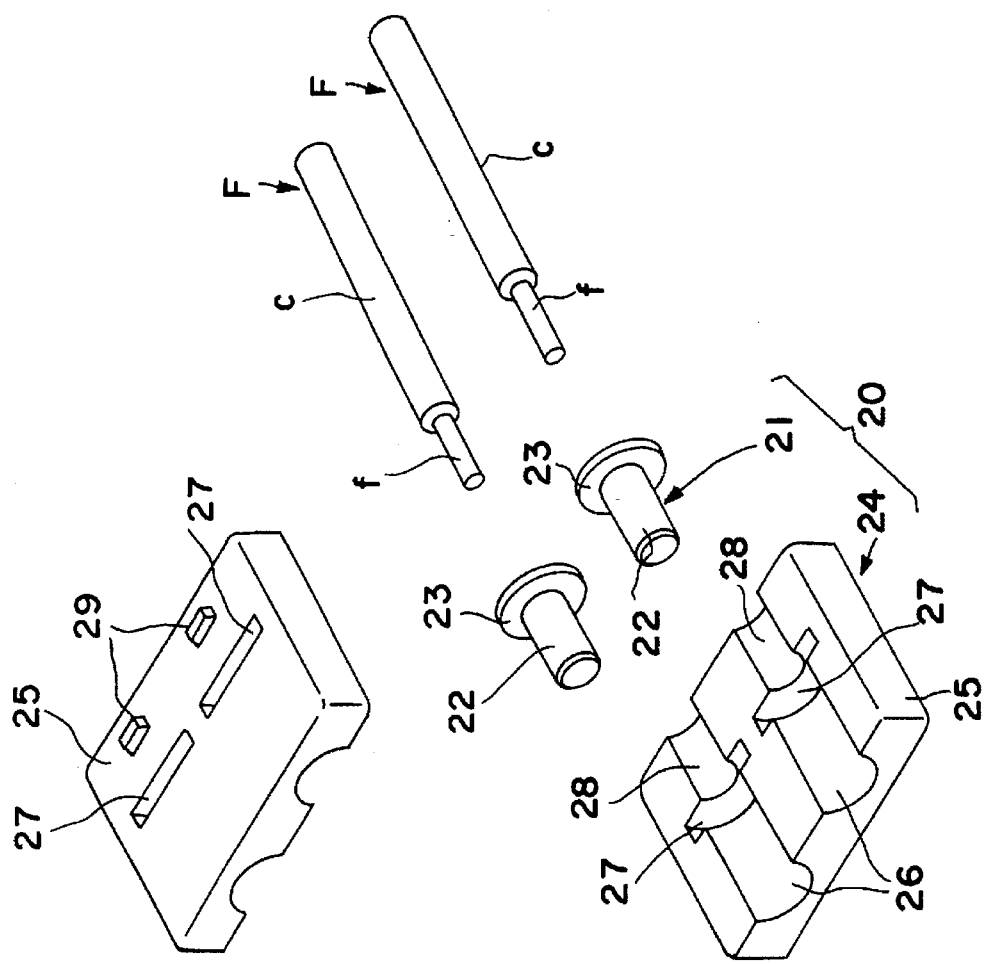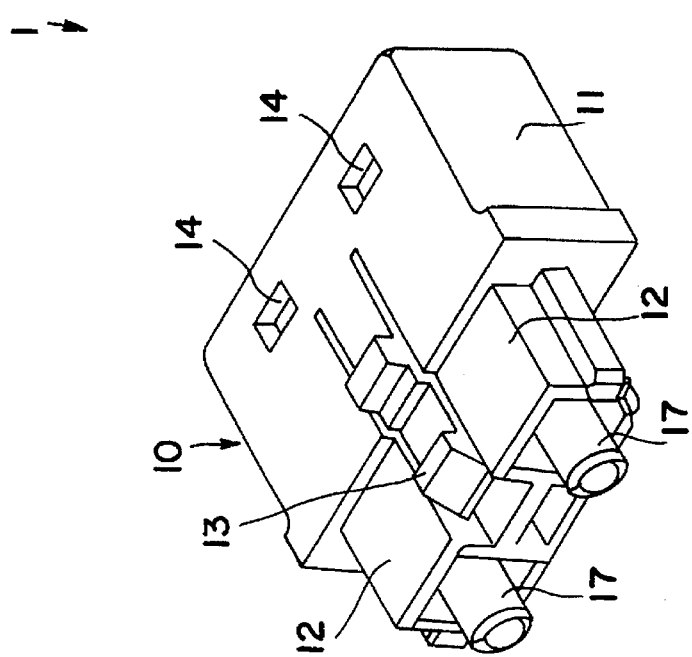
FIG. 3

CONNECTOR ASSEMBLY FOR ELONGATED ELEMENTS

This Application claims the benefit of priority of Japanese Application 7-146348, filed Jun. 13, 1995.

The present Invention relates to a connector assembly for elongated elements, especially for connecting such elements to other devices. The Invention also relates to a method of fixing the connector in a connector housing. For convenience, the Invention will be described for use with coated optical fibers, but it is understood that it is applicable to elongated elements generally, including electrical wires.

BACKGROUND OF THE INVENTION

Known optical fiber connectors include housings made of resin, fitted or integrally formed with ferrules. FIGS. 1a and 1b show optical fiber connector 50 comprising housing 51 made of resin and having integrally formed ferrules 52. Housing 51 further comprises metallic claws 55 for fixing optical fibers F. The metallic claws are generally U-shaped, as seen in FIG. 1b. In this type of device, each optical fiber F is stripped of coating c adjacent its end, thereby exposing fiber core f. Fiber F is then inserted into housing 51 through insertion paths 53, so that fiber core f fits into a corresponding ferrule 52. Insertion paths 53 of housing 51 are provided with slits 54 into which fixing claws 55 are edgewise inserted so as to engage the fiber. Edge portions 55a of fixing claws 55 are thereby pressed against coating c of optical fiber F, thereby fixing it in connector housing 51. By this method, approximately 80N of fixing force can be obtained. However, this force is not sufficient for vehicle applications, where at least 100N is required for such connectors.

FIG. 2 shows another known optical fiber connector 60 comprising a connector housing 61 made of resin and enclosing metallic ferrules 62. Stop 63 prevents ferrules 62 from disengaging. Spring 64 urges ferrules 62 towards the end of the connector housing. Protective cover 65 protects the insertion section where optical fiber F is introduced into connector housing 61.

Ferrules 62 comprise core holder 62a, which has a comparatively small inner diameter and through which fiber core f of the optical fiber F is inserted, coated-portion holder 62b, which has a comparatively large inner diameter and through which coated part c of the optical fiber is inserted, and flange 62c projecting radially outwardly at the periphery between core holder 62a and coated-portion holder 62b. Flanges 62c form abutment faces for spring 64.

To fix optical fiber F to connector housing 61, the end of coated part c of each fiber F is stripped, so that fiber core f is exposed; this end is inserted into ferrule 62, so that coated part c of optical fiber F is frictionally retained by holding part 62b, then springs 64 are inserted into the peripheral area of holding part 62b.

After they have been joined, the fiber end and ferrule 62 are inserted into connector housing 61 so that stop 63 causes springs 64 to press against flange 62c of ferrule 62. When viewed in a lateral cross-section, the inner surface of connector housing 61 presents shoulder 61a. When ferrule 62 is held in connector housing 61, flange 62c is urged against shoulder 61a, thereby insuring the fixing of each optical fiber F. Coating c of fiber F is crimped by holding part 62b of ferrule 62. While this method can provide a fixing force in excess of 100N, it requires precision metal-forming of the ferrules. This leads not only to higher ferrule production costs, but also to a need for other parts, such as springs 64 etc. resulting in further increased costs compared to the optical fiber connector shown in FIGS. 1a and 1b.

SUMMARY OF THE INVENTION

It is therefore an object of the present Invention to provide an optical fiber connector that can be fixed firmly to the connector housing and can be manufactured economically. It is another object of the Invention to provide a method for fixing the optical fiber in the connector housing. The present Invention comprises a retaining assembly for at least one optical fiber having a central core surrounded by a coating. A fixing device is provided which includes a clamping member and a holding member, the clamping member having a securing portion with an axial portion of the coating fixed therein. The holding member comprises at least a first receiving element having a channel therein; a part of the securing portion is located in the first channel.

In a preferred form of the device, the clamping member carries a flange which extends radially outward therefrom and there is a corresponding recess on the first receiving element. A part of the flange is inserted into the recess, thereby securing the clamping member and optical fiber within the receiving element. The securing portion of the clamping member is desirably crimped onto the coating of the optical fiber.

Advantageously, a second receiving element, with a second channel complementary to the first channel, is placed on the face of the first receiving element adjacent thereto. Since the second element corresponds fully with the first element, the two channels form a cylinder and the two recesses form a circular recess. The securing portion of the clamping member is entirely encompassed by the two channels and the flange is circumferentially within the circular recess. The foregoing constitutes the fixing device of the present Invention which can then be inserted into the connector housing.

The housing is provided with a ferrule extending forwardly from the back of the chamber and the exposed end of the optical fiber is retained therein. A ferrule housing surrounds the ferrule, but is spaced radially apart therefrom and permits mating with another connector.

While the assembly of the present Invention has been described thus far with respect to a single optical fiber and related elements, it is intended that a plurality of such fibers be included in a single device. In such cases, the parts as described herein are duplicated for each additional fiber.

To produce the inventive assembly, the optical fiber is inserted into the clamping member which is then crimped onto the coated portion of the fiber. The clamping member is then inserted into the holding member and the latter is, in turn, introduced into the chamber of the connector housing. At the same time, the exposed end of the fiber enters the ferrule and is retained therein for connection to a mating connector. As a result of the present Invention, not only is the assembly capable of withstanding a separating force of 100N, but the device is easy to assemble and the number of elements is reduced. For example, the clamping member, since it is not directly connected to the optical fiber, need not be manufactured with great precision. Thus, the present Invention allows reduction of manufacturing and assembling costs.

IN THE DRAWINGS

In the accompanying drawings, constituting a part hereof, and in which like reference characters indicate like parts, FIG. 1a is a section through an assembly of the prior art;

FIG. 1b is a transverse cross section of the device of FIG. 1a;

FIG. 3 is an exploded perspective view of the assembly of the present Invention.

Figure 2:
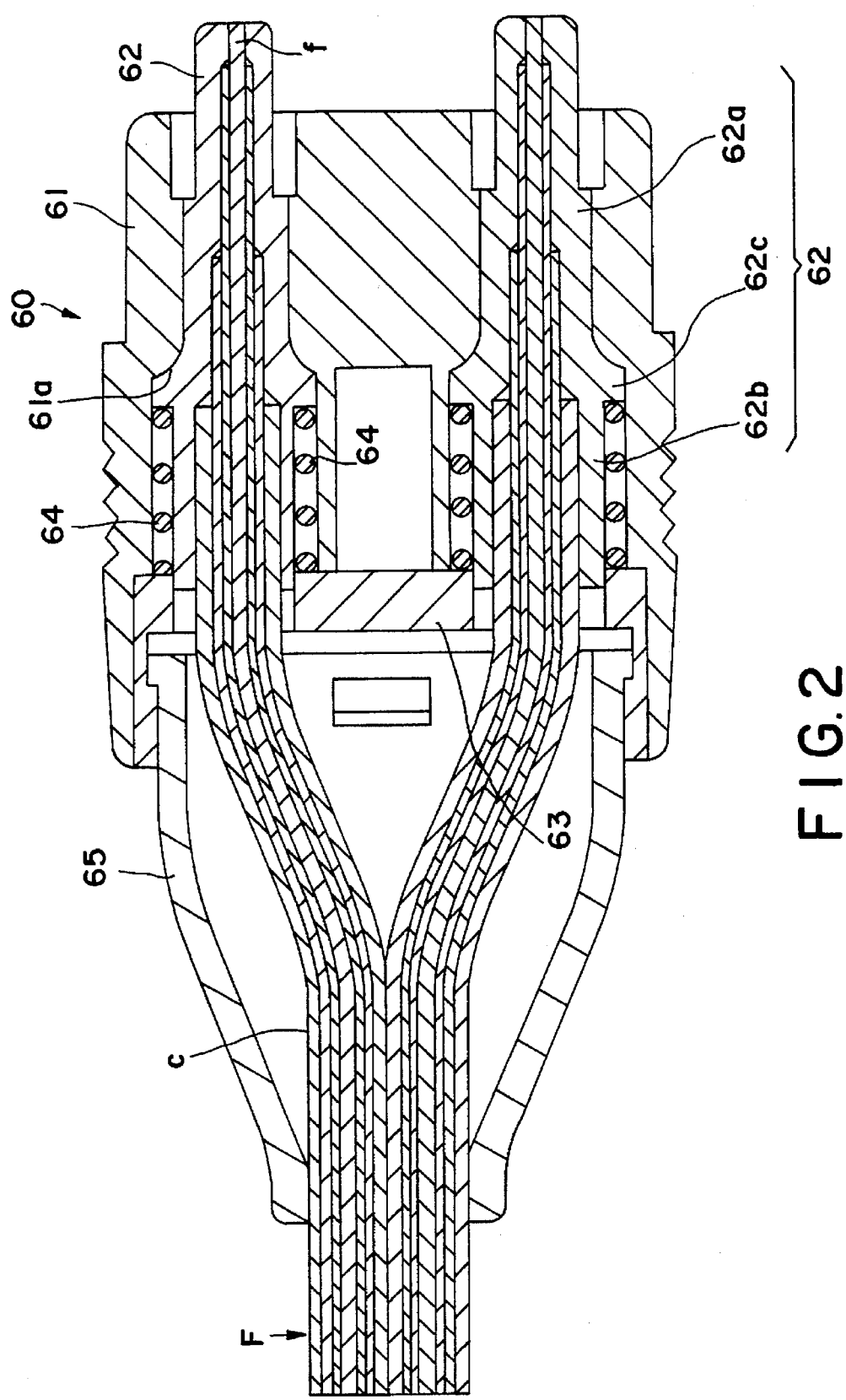
FIG. 2 is a view similar to that of FIG. 1a of another known connector.
Figure 4:
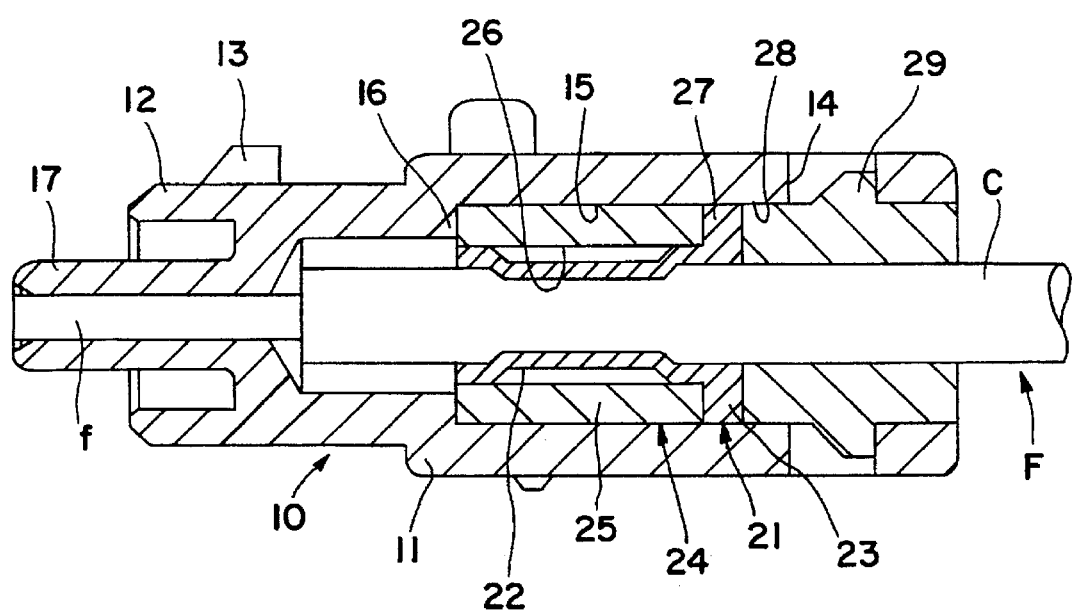
FIG. 4 is a cross section of the present Invention in its assembled form.

As shown in FIGS. 3 and 4, connector 1 is comprised of a connector housing 10 of resin and fixing device 20 which holds optical fiber F and is secured therein. Connector housing 10 comprises rectangular main housing portion 11 having ferrules 17 integrally provided on the front thereof. The rear of main housing portion, opposite the ferrules, has an opening for receiving complementary elements 25. Connection 13 on main housing portion 11 connects the main housing portion with another connector housing (not shown). Housing 11 is provided, on its outer face near the rear, with holes 14 which couple with protrusions 29 of fixing device 20. Chamber 15 includes a narrowed section which forms shoulder 16 against which the edge of fixing device 20 abuts to determine its position.

Fixing device 20 comprises clamping member 21, usually of a metal such as brass, and holding member 24, for retaining clamping member 21. Clamping member 21 includes cylindrical portion 22, with a passage for the optical fiber, and flange 23 integrally formed at one end thereof. The flange projects radially outwardly from the cylindrical portion. Optical fiber F is fixed by passing it through cylindrical portion 22, which is then pressed against the fiber from the outside.

Holding member 24 is a pair of complementary elements 25 made of resin. Element 25 is provided with channel 26 having semi-circular cross-section into which cylindrical portion 22 of clamping member 21, with optical fiber F to which it is fixed, is received. Flange portion 23 of clamping member 21 fits into slit 27 in element 25. Another channel 28, with a semi-circular cross-section, receives coated part c of optical fiber F. The outer surface of one of complementary elements 25 carries locking claws 29 which enter holes 14 in connector housing 10, thereby locking the elements in chamber 15. Once clamping member 21 is firmly fixed on optical fiber F, it is inserted into, and is retained by, elements 25, so that clamping member 21 is precisely positioned in holding member 24. Holding member 24, including clamping member 21 and fiber F, is then inserted in chamber 15 of connector housing 10.

As shown in FIG. 3, optical fiber F is stripped of its coating at its end, thereby exposing core f. Optical fiber F is then inserted into cylindrical portion 22 which is crimped onto coated part c. Thereafter, clamping member 21 is placed between elements 25 of holding member 24 and retained therein.

When clamping member 21 and holding member 24, which constitute fixing device 20, are inserted into chamber 15 of connector housing 10, the leading edge of fixing device 20 abuts against shoulder 16. Then, locking claws 29 enters holes 14, whereby fixing device 20 is held in connector housing 10, as shown in FIG. 4. At the same time, exposed fiber core f is inserted into ferrule 17, so that its optical axis is protected from dislocation.

If the resin forming the holding member is sufficiently strong, the clamping member need not be provided with the flange. In this case, the holding member may be provided a stop, and the clamping member has the matching recess into which the stop fits.

These and other changes may be made in the Invention without departing from the spirit thereof. The Invention is to be broadly construed and not to be limited except by the character of the claims appended hereto.

What we claim is:

1. A retaining assembly for at least one elongated element having a central core surrounded by a coating, said assembly comprising a fixing device including a clamping member and a holding member, said clamping member having a securing portion, an axial portion of said coating secured within said securing portion, said holding member comprising at least a first receiving element having a first channel therein, a part of said securing portion in said first channel, a flange extending radially outward from said clamping member, a first recess on said first receiving element, a part of said flange in said first recess, a second receiving element having a second channel therein, a part of said securing portion not in said first channel, in said second channel, a second recess on said second receiving element, a part of said flange not in said first recess, in said second recess, whereby said elongated element is secured to said fixing device.

2. The assembly of claim 1 wherein said securing portion is crimped on said coating.

3. The assembly of claim 1 wherein said second receiving element is opposed to said first receiving element, whereby said first channel and said second channel form a cylindrical channel, and said first slit and said second slit form a circular groove.

4. The assembly of claim 1 wherein there is an exposed portion of said core adjacent a leading end thereof, a connector housing having a receiving chamber open to a rear face thereof, said holding member inserted into said chamber through said rear face, a ferrule having a hollow bore extending from a front of said chamber, remote from said rear face, in a direction away from said rear face, said exposed portion of said core in said hollow bore, a ferrule housing surrounding said ferrule, spaced apart radially therefrom, and adapted to mate with another connector.

5. The assembly of claim 1 wherein said elongated element is an optical fiber.

6. The assembly of claim 1 wherein said securing portion is a cylindrical portion.

7. The assembly of claim 1 wherein said flange is circular and said recess is complementary to a part thereof.

8. The assembly of claim 1 wherein said first receiving element or said second receiving element has a protrusion on an outer surface thereof, a corresponding hole on said connector housing whereby, when said receiving element is in a receiving chamber of a connector housing, said protrusion is in said hole, thereby locking said first receiving element and said second receiving element in said chamber.

9. The assembly of claim 1 wherein said clamping member comprises a plate wrapped around said coating at said axial portion.

10. The assembly of claim 4 wherein said chamber has a narrow diameter portion between a front end of said fixing device and said ferrule, said narrow diameter forming an internal shoulder in said chamber, said front end of said fixing device bearing against said shoulder.

11. The method of producing the assembly of claim 4 comprising inserting a leading end of said elongated element into said clamping member, crimping said clamping member onto said coating, placing said clamping member and said securing portion in said first channel in said first receiving element, placing said second receiving element on said first receiving element to secure said clamping member between said first element and said second element to form said fixing device, placing said fixing device in said connector housing with said leading end projecting out of the front thereof.

12. The method of claim 11 wherein said coating is removed from said elongated element adjacent said leading end to form an exposed core, said exposed core being inserted into said hollow bore of said ferrule in said connector housing.

* * * * *